J. J. SQUIRE.
Clamp.

No. 162,866.

Patented May 4, 1875.

Witnesses.
J. B. Coghlan
G. W. Cummings.

Inventor.
John J. Squire
By Chas D Moody
atty.

UNITED STATES PATENT OFFICE.

JOHN J. SQUIRE, OF ST. LOUIS, MISSOURI, ASSIGNOR OF ONE-HALF HIS RIGHT TO JOSEPH W. BRANCH, OF SAME PLACE.

IMPROVEMENT IN CLAMPS.

Specification forming part of Letters Patent No. 162,866, dated May 4, 1875; application filed February 17, 1875.

*To all whom it may concern:*

Be it known that I, JOHN J. SQUIRE, of St. Louis, Missouri, have made new and useful Improvements in Clamps, of which the following is a full, clear, and exact description, reference being had to the annexed drawing making part of this specification, where—

Figure 1:
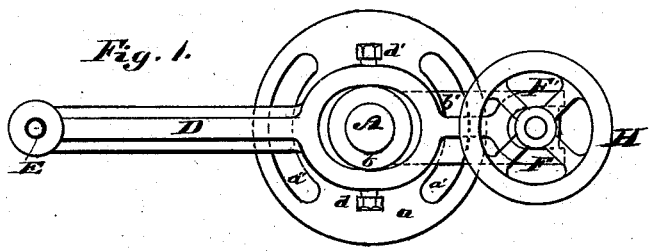
Figure 2:
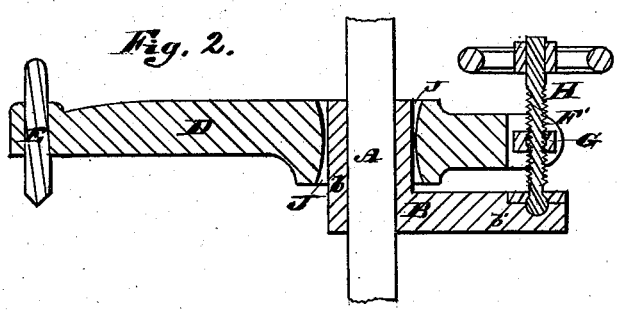
Figure 3:
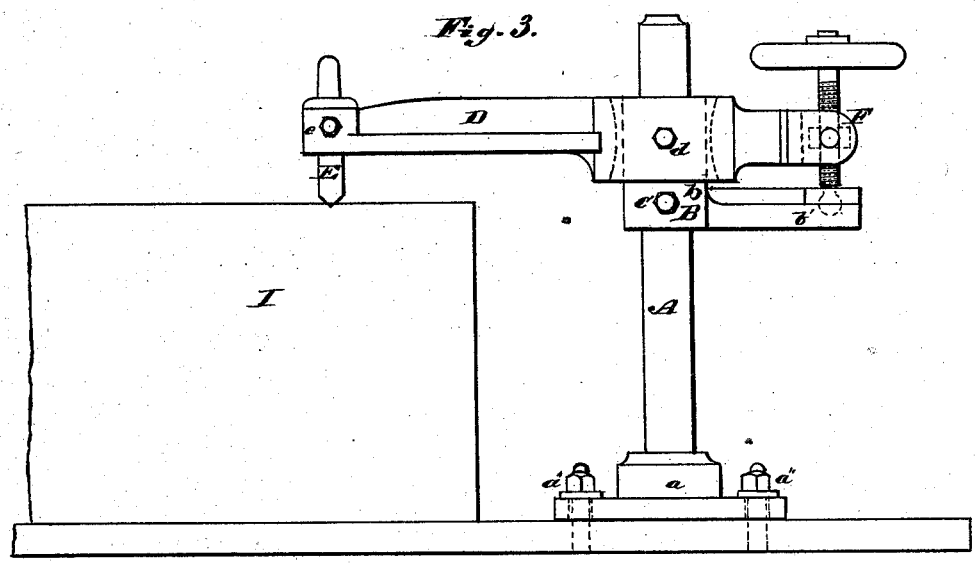

Figure 1 is a plan; Fig. 2, a central sectional elevation; Fig. 3, a side elevation.

Like letters indicate like parts.

To provide means for readily and securely clamping an object to its support is mainly the object of my invention.

Referring to the accompanying drawing, A represents a round post, stepped in a socket or base, $a$, which, by means of bolts or other suitable means, is fastened to the bed-plate supporting the object to be clamped, or to any suitable fixture adjacent. Upon this post is arranged what I term a shoe, B, consisting of a sleeve, $b$, from the lower end of which projects horizontally a part, $b'$. The shoe is adjusted vertically by slipping it on the post, and by rotating it a horizontal adjustment is provided for. It is fixed in the desired position by the screw C. D represents an arm, which is attached to and supported by the shoe in the following manner: At a point between its ends, the arm, being properly shaped, as shown in Figs. 2 and 3, is passed over the post and sleeve $b$, and is, at the points $d$ $d'$, pivoted to the upper portion of the latter. At its outer end the arm holds a dog, E. The inner part, on the opposite side of the post, has forked ends F F', and in these forked ends a nut, G, is journaled. A screw, H, works in this nut, passing down vertically through the nut, and, by means of a ball-and-socket construction, connected with and bearing upon the outer end of the projection $b'$ of the shoe.

The operation is as follows: Let I, Fig. 3, represent a block of stone or material arranged to be worked or operated on. The shoe carrying the arm is suitably adjusted vertically, and the arm swung around so as to bring the dog over the desired point. By means of the screw at the inner end of the arm a powerful leverage is then exerted upon the dog, bringing it down upon the block. The dog can be held in the arm by a screw, $e$, or, if desired, the point of the dog can, previous to the action of the screw, be set into the block. The tapering form of the dog and its socket in the arm provides for this, and also enables the arm to follow after and gripe the dog, and hold it securely. To provide for its tilting movement the arm is suitably shaped at J J.

It will be seen that the above-described construction constitutes a clamp of universal adjustability.

The arm can be readily raised to any height, and swung in any direction, and the entire device can be set in any desirable place. To provide for its being easily attached, the base $a$ is furnished with slots $a'$ $a'$, Fig. 1, through which, at any point, the bolts $a''$ $a''$ may be passed.

In consequence of the shape of the shoe at $b$, the strain caused by the action of the screw is not concentrated at a single point on the post, but is distributed.

As represented in the drawing, the clamp is arranged as for holding a block of stone, and is attached to the bed-plate supporting the block.

It is obvious, however, that the clamp can be applied in various positions—for instance, it can be attached to the ordinary head-block for holding a log, or to the bed of a planer to hold any object to it, or in any other position where a clamping device is desired.

I am aware that a holdfast has been used by cabinet-makers, consisting of a shank, whose lower end, in use, is passed through an opening in the table or supporting surface, and to whose upper end is permanently, (and in a fixed position,) attached a projecting arm, upon which is pivoted a lever, which is operated by a screw passing through the end of the lever, and bearing upon the top of the shank.

As the only way of adjusting such a device is by moving the shank up and down in the opening in the supporting-surface, it would, even if new with me, be useless as a universal clamp. I therefore disclaim it; but Having described my invention, what I claim as new therein, and desire to secure by Letters Patent, is—

The herein-described clamp, consisting of the post A, base $a$, shoe B, arm D, dog E, nut G, and screw H, combined and operating substantially as described and shown.

JOHN J. SQUIRE.

Witnesses:
ROBERT L. FOSBURGH,
CHAS. D. MOODY.